United States Patent [19]
Turner

[11] Patent Number: 5,692,961
[45] Date of Patent: Dec. 2, 1997

[54] UNIVERSAL JOINTS

[75] Inventor: Colin Francis Samuel Turner, deceased, late of West Midlands, England, by Maureen Ann Turner, legal representative

[73] Assignee: GKN Automotive AG, Lohmar, Germany

[21] Appl. No.: 549,743

[22] PCT Filed: Mar. 29, 1994

[86] PCT No.: PCT/GB94/00657

§ 371 Date: Nov. 7, 1995

§ 102(e) Date: Nov. 7, 1995

[87] PCT Pub. No.: WO94/27056

PCT Pub. Date: Nov. 24, 1994

[30] Foreign Application Priority Data

May 7, 1993 [GB] United Kingdom ............ 9309480

[51] Int. Cl.⁶ ............................................. F16D 3/226
[52] U.S. Cl. ................................. 464/146; 464/906
[58] Field of Search ......................... 464/100, 146, 464/144, 145, 141, 906; 403/138, 144

[56] References Cited

U.S. PATENT DOCUMENTS

| | | | |
|---|---|---|---|
| 1,498,171 | 6/1924 | Kaps | 464/141 |
| 2,496,869 | 2/1950 | Flumerfelt | 403/138 |
| 3,069,874 | 12/1962 | Leto | 464/146 |
| 3,204,429 | 9/1965 | Kayser | 464/141 |
| 4,027,927 | 6/1977 | Turner | 464/146 X |
| 4,180,344 | 12/1979 | Otsuka et al. | 464/146 X |
| 4,202,184 | 5/1980 | Krude et al. | 464/146 |
| 4,325,232 | 4/1982 | Girguis | 464/146 X |
| 4,432,740 | 2/1984 | Petiot | 464/146 |
| 4,493,676 | 1/1985 | Krude | 464/146 X |
| 4,995,850 | 2/1991 | Van Der Drift et al. | 464/906 X |

FOREIGN PATENT DOCUMENTS

| | | |
|---|---|---|
| 21 64 431 | 12/1972 | Germany. |
| 24 30 024 B1 | 6/1975 | Germany. |
| 31 41 079 A1 | 5/1983 | Germany. |

Primary Examiner—Daniel P. Stodola
Assistant Examiner—Eileen A. Dunn
Attorney, Agent, or Firm—Marshall, O'Toole, Gerstein, Murray & Borun

[57] ABSTRACT

A universal joint comprising outer and inner joint members with circumferentially spaced grooves extending lengthwise of the members; and balls disposed one in each facing pair of grooves in the joint members for torque transmission between the members; wherein at least some of the grooves in one of the joint members are each provided in a groove base portion with a recess extending lengthwise of the groove, and a spring element is disposed in each said recess and arranged to engage the respective ball to bias it radially of the joint and preferably also axially to the central region of the spring element.

16 Claims, 10 Drawing Sheets

UNIVERSAL JOINTS

This invention relates to universal joints, of the kind which comprises an outer joint member of hollow configuration; an inner joint member disposed at least partially within the outer joint member; a number of straight grooves provided in the interior of the outer joint member, circumferentially spaced about an axis of rotation of the outer joint member and extending lengthwise of the member; a number of straight grooves provided on the exterior of the inner joint member circumferentially spaced about the axis of rotation of the inner joint member and facing the grooves in the outer joint member in pairs; and a plurality of balls disposed one in each facing pair of grooves in the joint members, for torque transmission between the members. Such a joint will hereafter be referred to as a universal joint of the kind specified.

The joint may be a constant velocity ratio universal joint having a cage of annular configuration disposed between the two joint members and which has window which accommodate the balls and which maintain the balls with their centres in a single plane there being provided means for causing the balls when the joint is articulated (i.e. when the axes of rotation of the inner and outer joint members are inclined to one another) to be guided to assume positions such that the plane of the centres of the balls bisects the angle between the axes of rotation of the outer and inner joint members.

In one form of constant velocity ratio universal joint, the grooves extending lengthwise of the joint members are inclined (skewed) relative to the axes of rotation of the joint members. In each pair of grooves receiving a torque-transmitting ball the groove in the outer joint member is oppositely inclined to the groove in the inner joint member so that if such grooves could be viewed together in the direction perpendicular to the axis of rotation of the aligned (non-articulated) joint they would appear to cross one another with the ball constrained to be positioned where they cross. When the joint is articulated, such groove configurations cause the ball centres to lie in the bisector plane as above referred to.

The invention has been devised however in relation to a constant velocity ratio universal joint of the type which is commonly, and will herein be, referred to as a double offset joint. Wherein the means which guides the balls takes the form of offset part-spherical surfaces provided on the cage, co-operating with surfaces associated with the joint members. In one form of double offset joint the grooves in the outer and inner joint members extend parallel to the axes of rotation of the respective joint members and between the grooves in the outer joint member the internal surface of such member is cylindrical. The cage of the joint has an external part-spherical surface which engages the internal cylindrical surface of the outer joint member between the grooves thereof and further has an internal part-spherical surface which engages an external part-spherical surface associated with the inner joint member. The internal and external part-spherical surfaces of the cage are arranged such that their centres of curvature are offset by substantially equal distances on opposite sides of the plane in which the centres of the balls lie.

When such a double offset joint is articulated the offset of the part-spherical internal and external surfaces of the cage has the effect of steering the cage so that the ball centre plane is caused to bisect the angle between the axes of rotation of the joint members, thereby imparting the required constant velocity ratio operating characteristics to the joint.

Further, since the grooves in which the torque transmitting balls are received are parallel to the axes of the respective joint members in which they are provided, and the cage is not axially constrained relative to the outer joint member, the joint is able to accommodate plunge, i.e. relative axial movement between the joint members.

The joint may be one in which the external part-spherical surface associated with the inner joint member, with which the internal part-spherical surface of the cage engages, is provided directly on the inner joint member or a part fixed relative thereto. Preferably, however, said external part-spherical surface associated with the inner joint member is provided on a guide member or members movable axially relative to the inner joint member. In such a joint, the cage is able to move axially relative to both of the joint members when the joint plunges, and hence the balls are able to roll along the grooves in both joint members. This condition, so called "rolling plunge", considerably reduces the frictional resistance of the joint to plunge compared with the situation existing if the cage is axially fixed relative to one of the joint members such as the inner joint member in which case the balls have to skid along the grooves in the other joint member.

One problem which arises in connection with all types of universal joint of the kind specified is that production tolerances have the effect that some radial clearances may exist in the joint, i.e. there is some play which permits slight radial movement of the two joint members relative to one another. This radial play gives rise to an instability in the joint particularly when it is operating at high rotational speeds under conditions of low angles of articulation e.g. conditions which arise when the joint is utilised in the propeller shaft of a motor vehicle. This leads to vibration harshness and wear in use.

A further problem which arises specifically in connection with rolling plunge double offset joints as above described is that in use there is a tendency for the cage to assume a position at or adjacent one end of its range of possible movement relative to one of the joint members. This has the result that rolling plunge can then only take place from such a starting position in one direction of relative axial movement between the joint members. In the other direction, because the cage cannot move any farther relative to one joint member, the balls must skid along the grooves in the other joint member with consequent high resistance to plunge in that direction.

It is broadly the object of the present invention to overcome or reduce the problem first above referred to in relation to joints of the kind specified. It is a more specific object of the invention to overcome or reduce the problem latterly mentioned in rolling plunge double offset joints. Other advantages arising from the invention will be referred to hereafter.

According to one aspect of the invention, we provide a universal joint of the kind specified wherein at least some of the grooves in one of the joint members are each provided in a groove base portion with a recess extending lengthwise of the groove, and a spring element is disposed in said recess and arranged to engage the respective ball to bias it radially of the joint.

Preferably the spring element is of elongate configuration extending substantially the entire length of the groove engaged by the ball in use of the joint. Preferably the spring element is a leaf spring element comprising a relatively long and narrow strip of resilient sheet material e.g. spring steel.

In a joint according to the invention, the spring elements have the effect of preventing any uncontrolled and unstable radial displacement of the inner joint member relative to the outer joint member which may arise as a result of radial clearances between the balls and grooves in the joint members.

The invention is applicable to joints of the kind specified which are not constant velocity ratio joints, or to joints which are constant velocity ratio joints, e.g. of the cross-groove type above referred to.

Preferably however, the joint is a constant velocity ratio universal joint of the double offset type, and further preferably it is a joint which provides for rolling plunge as above described.

In this case, each said spring element is preferably also arranged to bias the respective ball to a position generally in the central region of the spring element.

In use, therefore, after plunging displacement of the two joint members relative to one another has taken place, the spring elements recentralise the balls and cage relative to the joint member wherein the spring elements are provided, so that the next plunging movement of the joint takes place under rolling plunge conditions. Further, any tendency for the balls and cage to migrate to one end of their range of travel relative to that joint member is eliminated.

Preferably as viewed in cross-section in a plane containing the axis of rotation of the joint member, each spring element has a configuration such that the axially directed component of force applied to the ball increases as end portions of the spring element are approached, thereby to achieve said biasing of the ball to a central region of the length of the groove.

Preferably the spring element is provided at or adjacent its ends with stop formations engageable with the respective ball to limit movement of the ball along the groove. Such stop formations may comprise tags or the like integral with the spring element.

Whilst it is possible for separate spring elements to be provided for each groove of the joint member and such embodiments are described hereafter, it is convenient if the spring elements are integral with an annular element, from which the spring elements extend. The spring elements and annular elements may be manufactured as a pressing of a suitable sheet material e.g. spring steel.

The annular element may be adapted to be secured to the joint member, e.g. by including a surface for engagement by a spring ring or the like.

The spring elements may be provided in the grooves of the inner joint member or of the outer joint member. Embodiments of both such arrangements are described hereafter.

The invention will now be described by way of example with reference to the accompanying drawings, of which.

Figure 1:
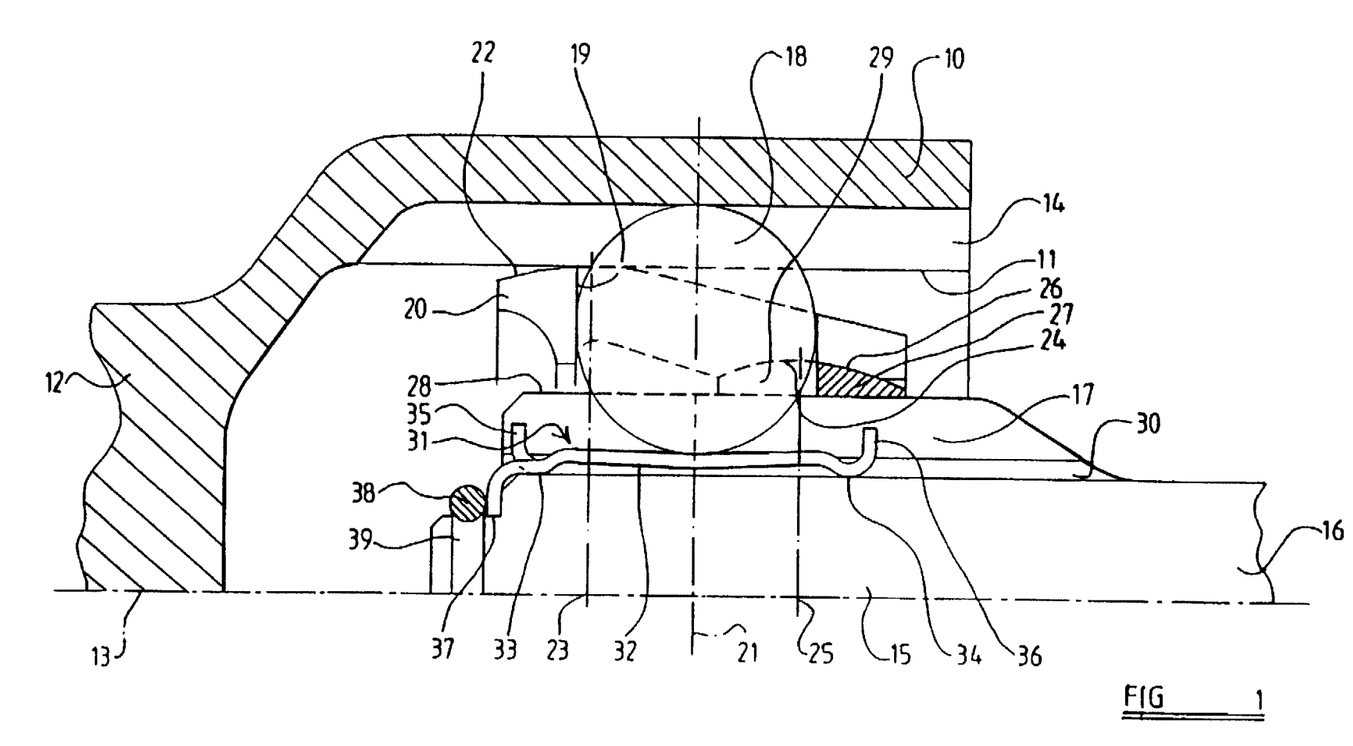
FIG. 1 is a longitudinal cross-section through part of a first embodiment of joint according to the invention.

Referring firstly to FIG. 1 of the drawings this illustrates part of a constant velocity ratio universal joint of double offset type. The joint comprises a cup-shaped outer joint member 10 having a cylindrical internal surface 11. At its closed end, the outer joint member has a portion 12 which may extend or connect to a shaft drive flange, or any appropriate torque-transmitting component. The axis of rotation of the outer joint member is indicated at 13 and the joint member is provided in its interior with a number of grooves 14 equally circumferentially spaced about and extending parallel to the axis 13. By way of example there may be five such grooves 14, leaving five remaining portions of the cylindrical surface 11 therebetween.

Within the outer joint member there is disposed an inner joint member 15. As illustrated this is formed integrally with the end of a shaft element 16. The inner joint member 15 is provided externally with grooves 17 equally circumferentially spaced about the axis of rotation of the inner joint member and extending parallel thereto, the grooves 17 facing the grooves 14 in the outer joint member in opposed pairs. As the joint in FIG. 1 is shown in the aligned (non-articulated) condition, the axis of rotation of the inner joint member is coincident with the axis of rotation 13 of the outer joint member.

A plurality of balls 18 is arranged one ball in each facing pair of grooves 14, 17 for torque transmission between the joint members. The balls occupy individual radially extending apertures or windows 19 in a cage 20 of annular configuration disposed between the inner and outer joint members. The cage constrains the balls 18 such that their centres lie in a plane 21 which, when the joint is in the aligned condition, is perpendicular to the common axis of rotation 13 of the two joint members.

As is generally known for constant velocity ratio universal joints, the cross sectional shape of each of the grooves 14, 17 may be part of a "gothic arch" to provide angular contact between each groove and the respective ball.

The cage has an external part-spherical surface 22 which engages the cylindrical surface 11 of the outer joint member between the grooves 14 therein. The centre of curvature of the part-spherical surface lies at a point 23. The cage further has an internal part-spherical surface 24 whose centre of curvature 25 lies on the opposite side of the ball centre plane 21 from the centre of curvature 23 of the outer part-spherical surface of the cage. The centres of curvature 23, 25 are substantially equidistant from the ball centre plane 21: in theory, they are exactly equidistant but in practice there may be some variation to compensate for production tolerances. The internal part-spherical surface 24 of the cage engages an external part-spherical surface 26 provided on an annular component 27 which is slidable axially on a cylindrical external surface 28 of the inner joint member 15 between the grooves 17 thereon. The component 27 has axially extending recesses 29 which accommodate parts of the balls 18. In known manner, the offset of the centres of curvature of the internal and external part-spherical surfaces of the cage has the effect that when the joint is articulated the ball centre plane is constrained to bisect the angle between the rotational axes of the inner and outer joint members, thereby giving the joint constant velocity ratio running characteristics. The ability of the cage to move axially relative to both the inner and outer joint members means that when the two joint members move axially relative to one another, i.e. when the joint plunges, the balls are able to roll along the grooves in the joint members thereby ensuring minimal frictional resistance to such plunge.

Each of the grooves 17 provided in the inner joint member 15 has at its base a recess 30 which is generally of rectangular shape as viewed in transverse cross-section. In the recess of each of the grooves there is accommodated a respective spring element indicated generally at 31 and whose configuration is seen most clearly with reference to FIG. 3 of the drawings. As viewed in lengthwise cross-section in a plane containing the axis of rotation of the inner joint member as in FIG. 1, each spring element 31 comprises a central portion 32 and opposite end portions 33, 34 which are bent downwardly to contact the base of the recess 30 followed by upwardly extending tags 35, 36 which reach into the grooves 17 to provide stop formations engageable with the ball 18 in the groove. Beyond the portion 33, the spring element extends to an annular portion 37 retained against a shoulder at the free end of the inner joint member by a spring ring 38 engaging an annular groove 39.

The dimensions and configuration of the spring element 31 are such that its central portion 32 just extends out of the recess 30 at the base of groove 17 and into the groove to be engageable by the ball 18 occupying the groove. Such engagement causes the central portion 32 of the spring element to assume a slightly bowed configuration so that if it is engaged by the ball other than substantially exactly mid-way between the ends of the spring element, a force is exerted on the ball which has both a radial component and an axial component, the latter of which biases the ball towards the point mid-way between the ends of the spring element. Therefore any tendency for the joint to run with the balls and the cage at one end of their range of permissible movement relative to the inner joint member is reduced or eliminated, since the spring elements always attempt to cause centralisation of the balls and cage relative to the spring elements. When the joint plunges from this position, in either direction, the balls are able to roll along the grooves in the joint members rather than skid therealong.

As a ball approaches either end of a spring element, the effective lever arm by which it slightly deforms the spring element is reduced. Effectively this renders the spring element stiffer, providing an increased component of force biasing the ball axially towards the mid-point between the ends of the spring element.

Figure 3:
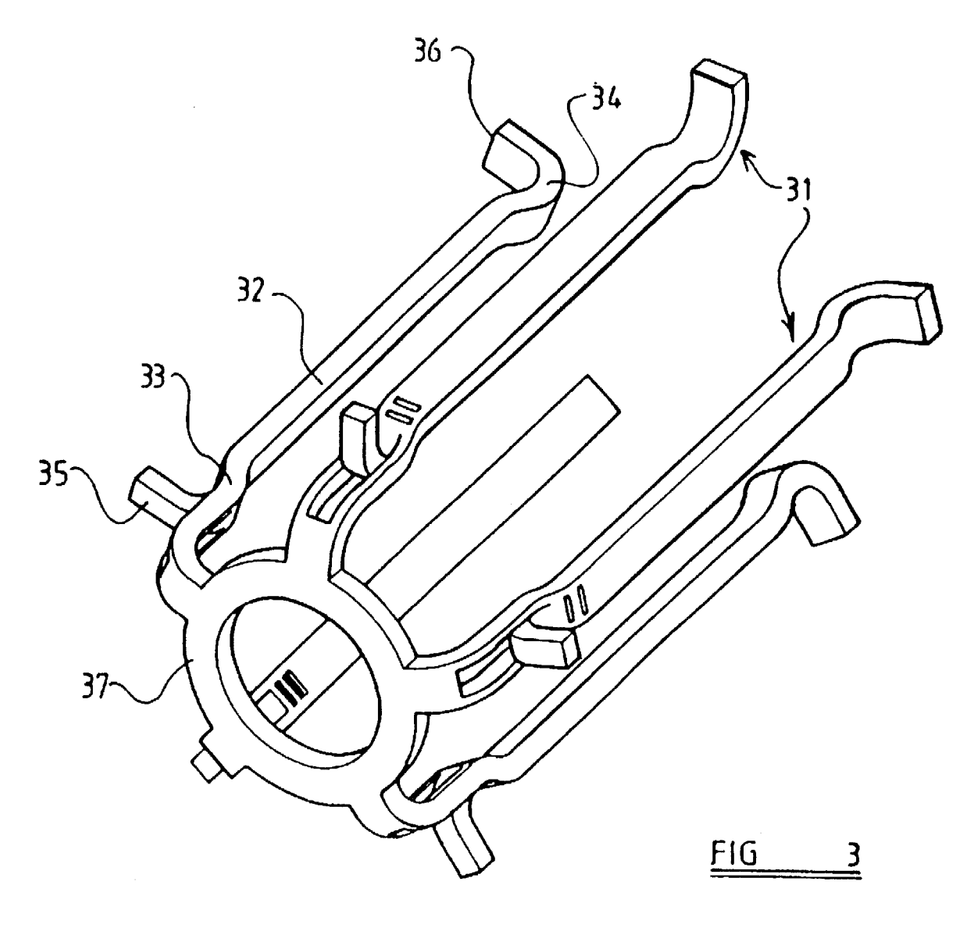
FIG. 3 is a perspective view of part of the joint of FIG. 1.

FIG. 3 shows a unitary component which includes the spring elements 31 for all the grooves 17 of a joint as shown in FIG. 1. This joint is one having five grooves 17, and hence five spring elements 31. The component shown in FIG. 3 is an integral component made by pressing operations on a suitable material such as spring steel. FIG. 3 clearly shows how the spring elements are connected beyond their portions 33 to an annular collar portion 37.

Figure 2:
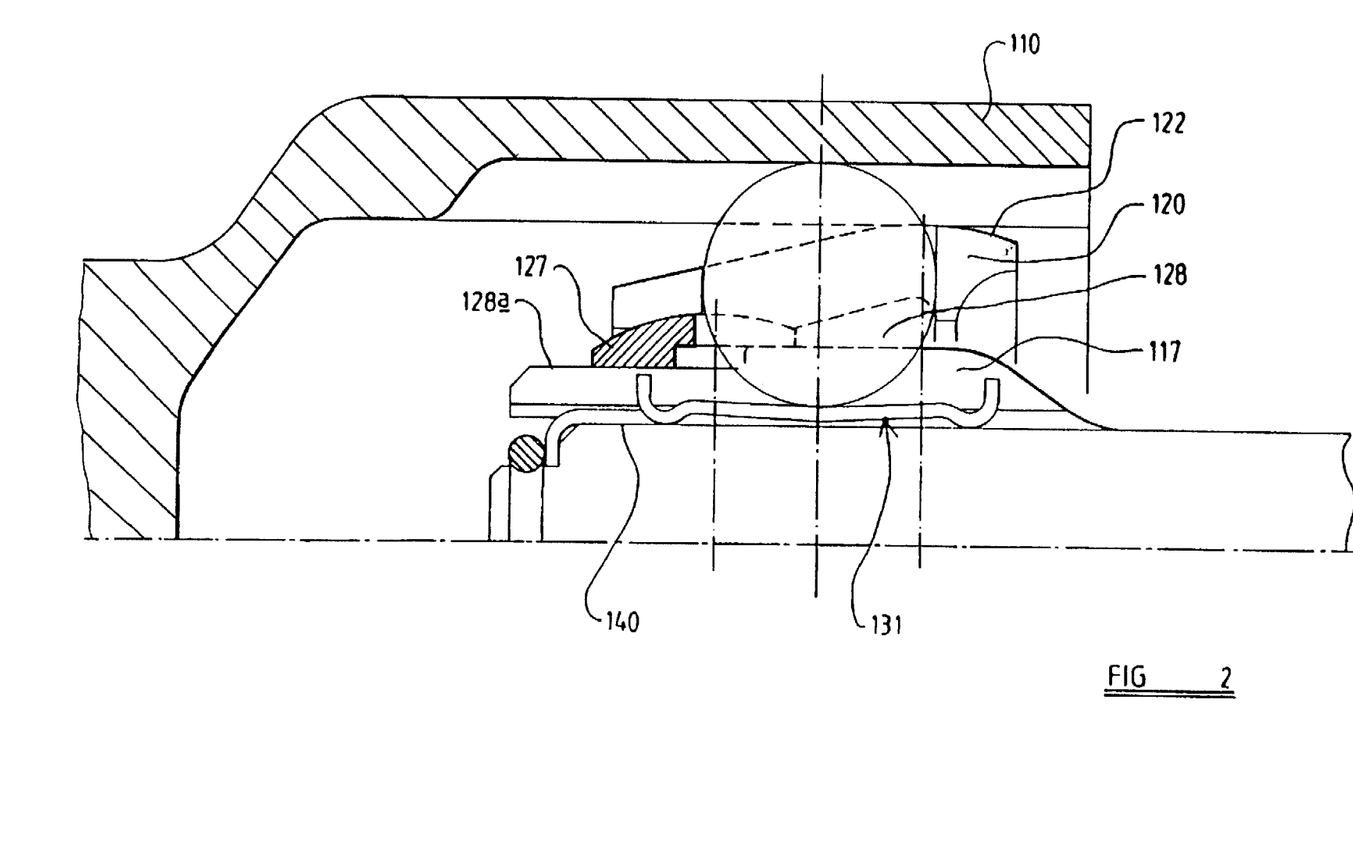
FIG. 2 is a longitudinal cross-section through part of a second embodiment of joint according to the invention.

Referring now to FIG. 2 of the drawings, this shows a joint which is similar in principle to the joint of FIG. 1 and therefore will not be described again in its entirety. Parts corresponding in form and/or function to parts of the joint of FIG. 1 are identified by the same reference numerals as are used in FIG. 1, but with the addition of 100.

The joint of FIG. 2 differs from that of FIG. 1 in that it is intended to be capable of articulation to a higher angle than the FIG. 1 joint. To facilitate this the outer surface 128 of the inner joint member between the tracks 117 thereof has a portion 128a of smaller diameter, adjacent the free end of the inner joint member. The component 127 has a correspondingly stepped internal configuration. The cage 120 is reversed axially compared with the cage of the FIG. 1 embodiment, i.e. the end of the cage having the external part-spherical surface 122 lies adjacent the open end of the outer joint member 110 instead of the closed end. It is the smaller diameter portion 128a of the outer surface of the inner joint member which permits the joint to operate at a higher angle than the FIG. 1 embodiment of joint, and the axial reversal of the cage enables the joint to be assembled in respect of the fitting of the component 127 to the inner joint member. The operative portions of spring element 131 are as above described in relation to FIG. 1; the component affording the five spring elements 131 has an elongated portion 140 compared with the corresponding portion of the joint shown in FIG. 1.

Figure 4:
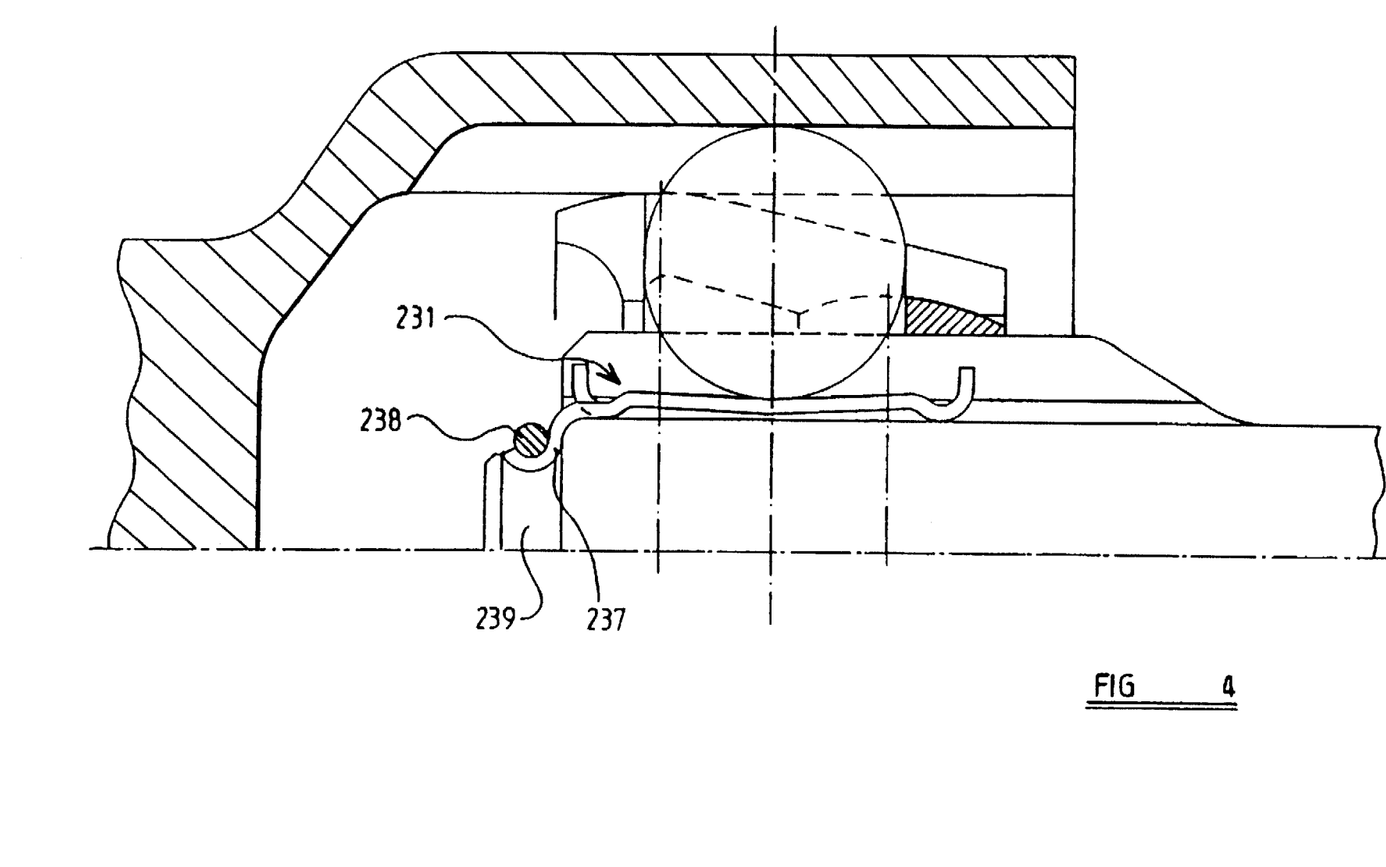
FIGS. 4 to 7 are views as FIGS. 1 and 2 of yet further embodiments of joint according to the invention.

Referring now to FIG. 4 of the drawings, this shows a joint whose outer joint member, inner joint member, cage and associated components are identical to the joint of FIG. 1 and will not therefore be described again. In this embodiment however instead of providing a unitary component affording the spring elements received in the recesses at the bases of the grooves in the inner joint member individual spring elements 231 are provided. Each spring element 231 has a somewhat S-shaped end portion 237 received in an annular groove 239 at the free end of the inner joint member, the portions 237 of all the spring elements being embraced so as to be firmly held by a spring ring 238.

Figure 5:
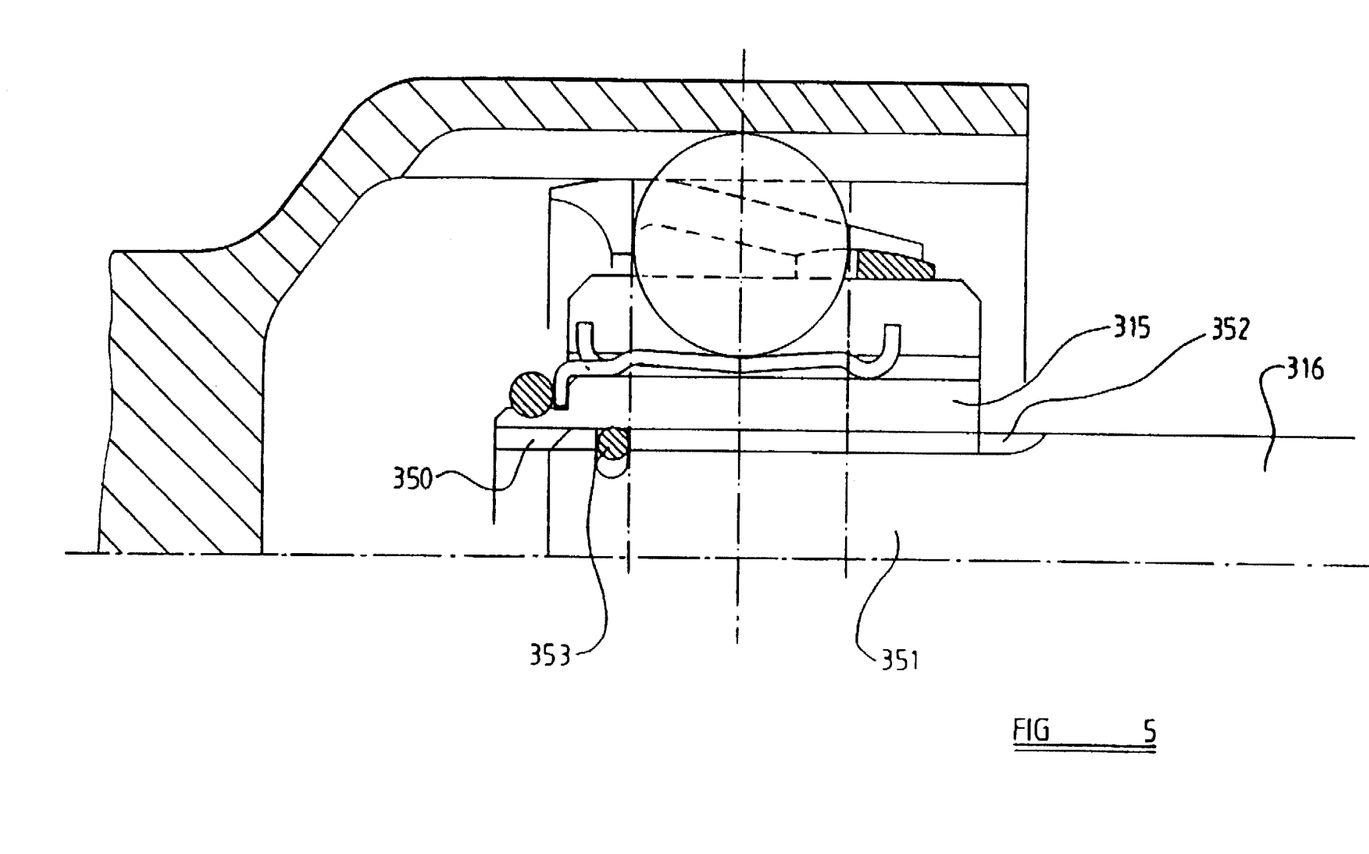

Referring now to FIG. 5 of the drawings, this shows an embodiment of joint in which once again, the principle of operation is as above described and parts corresponding in form and/or function to parts above described are identified by the same reference numerals but in the 300 series. In FIG. 5, however the inner joint member 315 is not integrally formed or permanently connected to the end of shaft 316, but instead has a splined bore 350 which fits on an end portion 351 of shaft 316. The end portion 351 of the shaft has external splines 352 which cooperate for torque transmission with the splines in the bore 350 of the inner joint member 315, and these two components are held together axially by a spring ring 353 engaging opposed annular formations in the region of the cooperating splines. Otherwise the operative parts of the joint are as above described in relation to FIG. 1 or FIG. 4.

Figure 6:
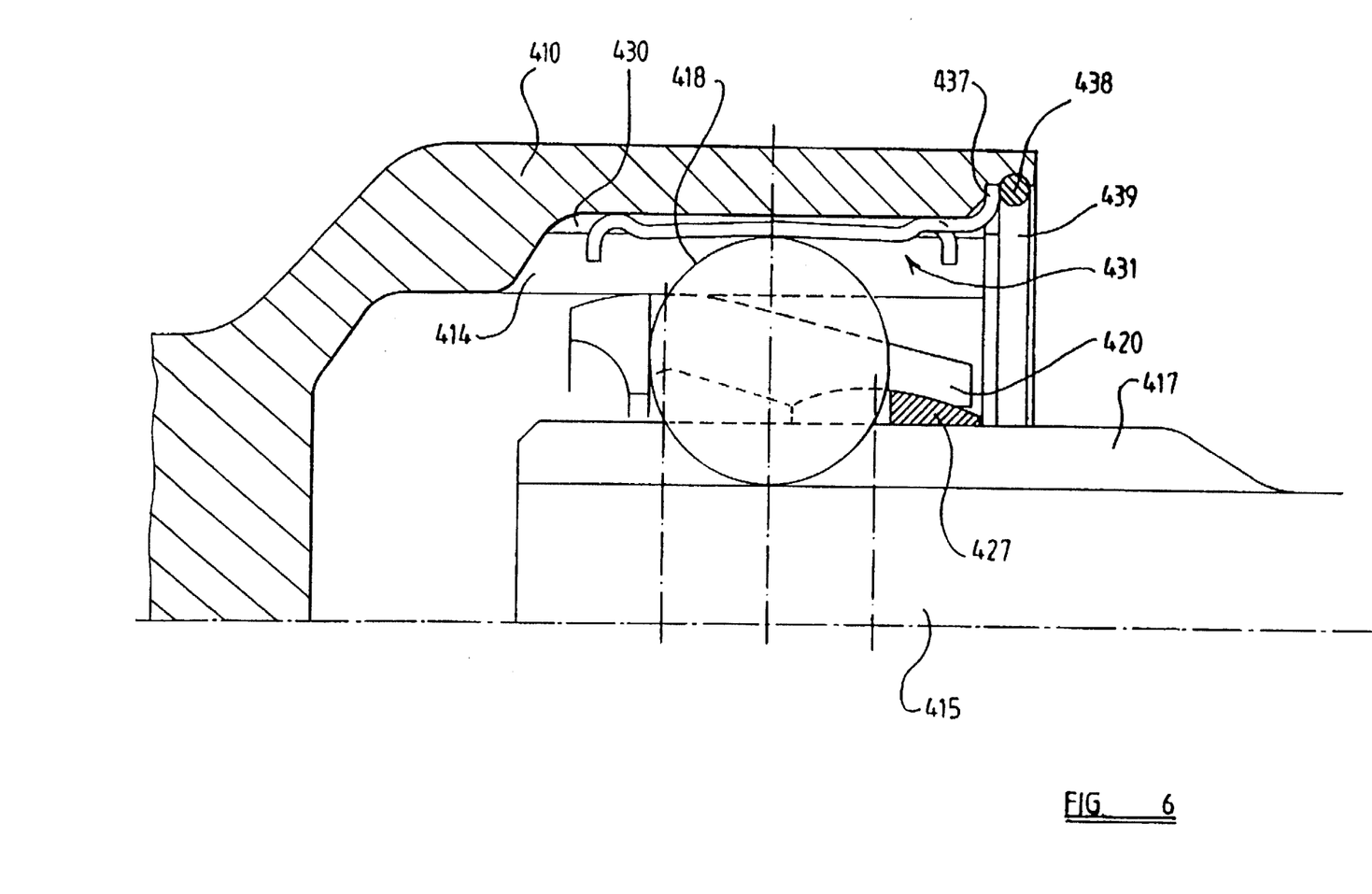

Referring now to FIG. 6 of the drawings, this shows an embodiment of joint which is analogous in its mode of operation but somewhat different in construction to the joints above described. Once again, parts corresponding in form and/or function to parts above described are identified by the same reference numerals, but in the 400 series.

The joint of FIG. 6 comprises an outer joint member 410 with grooves 414 in its interior, an inner joint member 415 with grooves 417 on its exterior torque transmitting balls 418, and a cage 420 with internal and external part-spherical surfaces, and an axially slidable component 427 on the inner joint member all as above described. In this embodiment, however, the grooves 414 in the outer joint member are provided with recesses 430 extending lengthwise along the bases thereof, and spring elements 431 are accommodated in such recesses. The spring elements 431 are substantially the same in their configuration as the spring elements above described, with the difference that they are integral with an outwardly extending annular element 437 retained at the open end of the outer joint member by a spring ring 438 in an inwardly facing annular groove 439.

In operation the joint of FIG. 6 is analogous to the joints previously described, with the difference that the balls and cage are axially centered relative to the outer joint member rather than the inner joint member.

Figure 7:
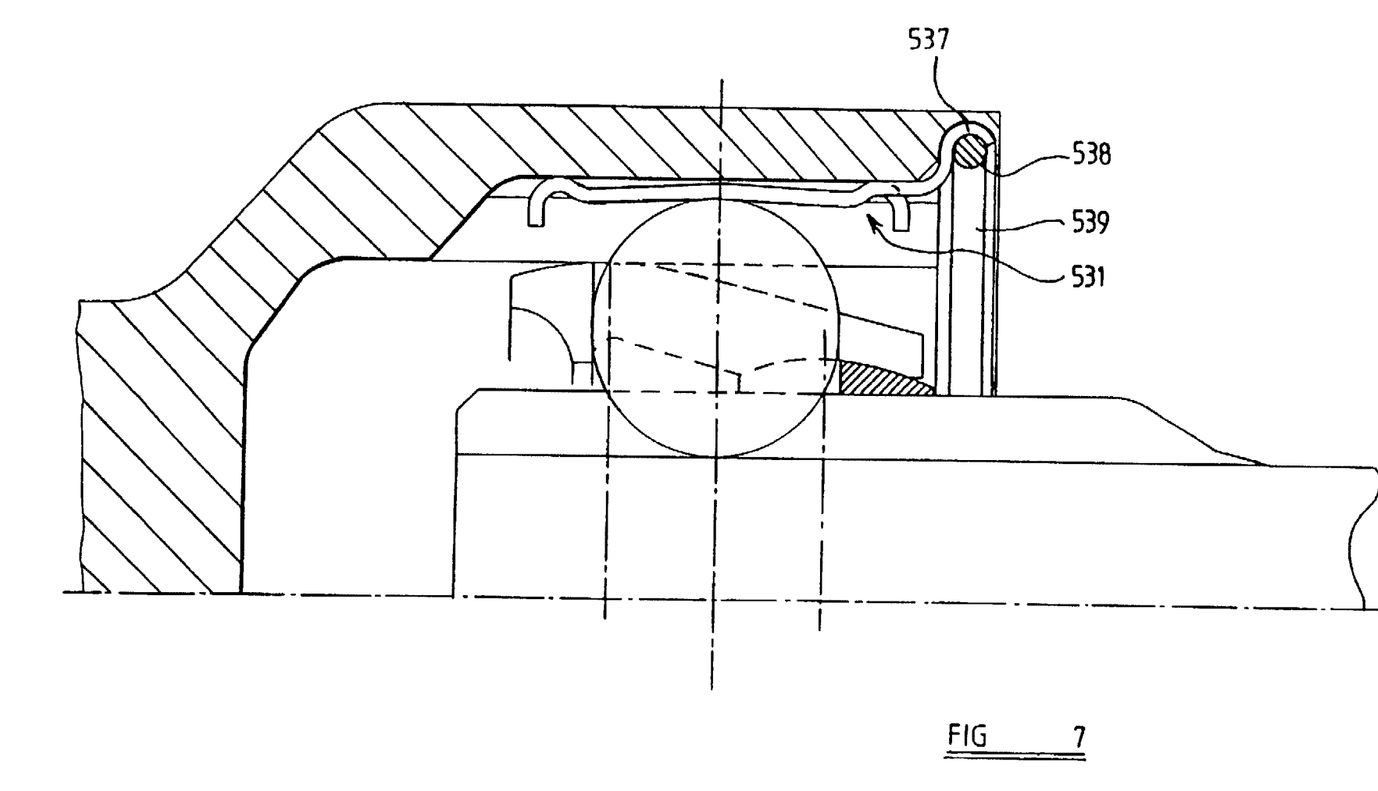

FIG. 7 shows a joint which is similar to that of FIG. 6, but with the difference that, analogous to the joint of FIG. 4, individual spring elements 531 are provided instead of spring elements integral with an annular element. Somewhat S-shaped end portion 537 of the spring elements are retained in an annular groove 539 by a spring element 538.

In addition to the axial centering effect of the spring elements provided in the joints above described, it will be appreciated that the radial components of the forces the spring elements exert on the balls in the joints, whether such radial components act outwardly as in the joints of FIGS. 1 to 5 or inwardly as in the joints of FIGS. 6 and 7, have the effect of eliminating any radial play from the joints. When such joints are used in high speed applications at relatively small angles of articulation e.g. for motor vehicle propshafts, this is extremely advantageous in achieving enhanced stability of operation and smoothness. Indeed spring elements as above described may be provided in joints other than the rolling plunge double offset joints above described and illustrated to achieve this advantageous effect, even if such joints do not require the axial centering function of the spring elements.

Figure 8:
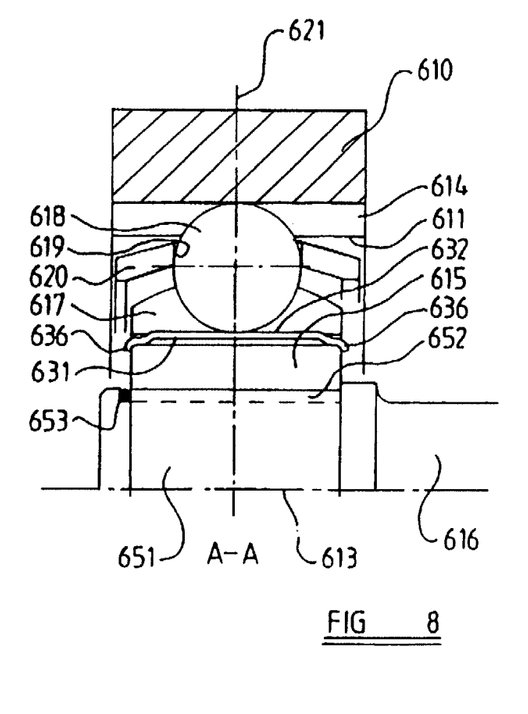
FIG. 8 is a longitudinal cross-section through part of a further embodiment of joint according to the invention.
Figure 9:
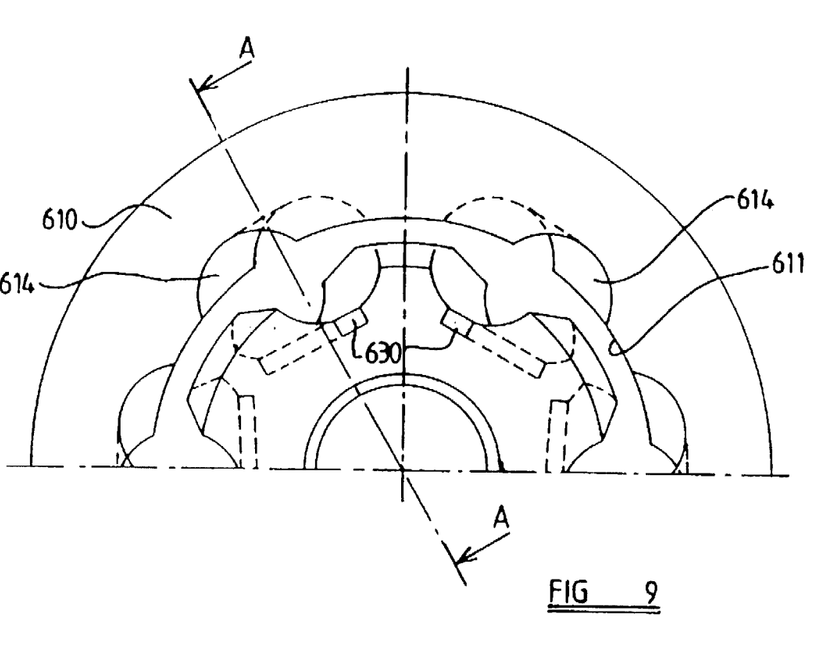
FIG. 9 is an axial view of the joint of FIG. 8.

Referring now to FIGS. 8 and 9 of the drawings, these illustrate the use of spring elements somewhat as above described in a universal joint which is a constant velocity ratio joint but which is of the "cross-groove" type instead of the double offset type above described.

The joint shown in FIGS. 8 and 9 comprises an outer joint member 610 which is in the form of a hollow cylinder with an internal surface 611. Although not illustrated, the outer joint member would be provided with means such as for example, an attachment flange, by which it would be connectable for torque transmission with another rotary component. The axis of rotation of the outer joint member is indicated at 613, and the joint member is provided in its interior with a number of grooves 614 circumferentially spaced about the axis 613. The grooves 614 are not parallel to the axis 613 but instead are skewed relative thereto so that as viewed in a direction perpendicular to the axis 613 the centre line of each groove 614 appears to be inclined to the axis 613. The outer joint member has six grooves 614 in its interior and three of these grooves are skewed in one sense while the other three grooves are skewed in the opposite sense so that adjacent grooves 614, as seen in FIG. 9, are skewed oppositely to one another.

Within the outer joint member there is disposed an inner joint member 615 which is of annular configuration and is received, with a splined connection 652 retained by a spring ring 653, on an end portion 651 of a drive shaft 616. The inner joint member 615 is provided on its exterior with grooves 617 which face the grooves 614 in the outer joint member in pairs. The grooves 617 are skewed relative to the axis of the inner joint member (which as the joint is shown in the non-articulated condition is coincident with the axis of rotation 613 of the outer joint member) and the arrangement of the grooves 617 is such that in each pair of opposed grooves the groove in the outer joint member is skewed in the opposite sense to that in the inner joint member. If the grooves of each pair could be viewed together in the direction perpendicular to the axis 613 they would appear to cross one another.

A plurality of balls 618 is arranged one ball in each facing pair of grooves 614, 617 for torque transmission between the joint members. The balls occupy individual radially extending apertures 619 in a cage 620 of annular configuration disposed between the inner and outer joint members. The cage constrains the balls so that their centres lie in a plane 621 which, when the joint is in the aligned condition, extends perpendicular to the common axis of rotation 613 of the two joint members. The cage does not, however, engage either of the joint members and has been omitted from FIG. 9 for clarity.

The above described "crossing" configuration of the grooves in the two joint members has the effect that each ball 618 is constrained to lie where its respective pair of grooves 614, 617 cross one another, and when the joint is articulated the effect is that the plane 621 bisects the angle between the rotational axes of the two joint members. As described so far, such a joint is well known.

According to the invention each of the grooves 617 in the inner joint member has, extending along its base a recess 630 of rectangular cross-sectional shape. In each such recess there is disposed a respective spring element 631 which has a central portion 632 which just extends out of the recess 630 to engage the respective ball 618, and end portions 636 which engage end surfaces of the inner joint member so that the spring element is retained axially relative to the inner joint member.

The spring elements have the effect of urging the balls radially outwardly and centering the inner joint member relative to the outer joint member, providing enhanced stability of operation and smoothness as above referred to. The spring elements are not required to provide any axial centering action on the balls since the position of the balls is determined solely by the configuration of the grooves they engage in the two joint members.

Figure 10:
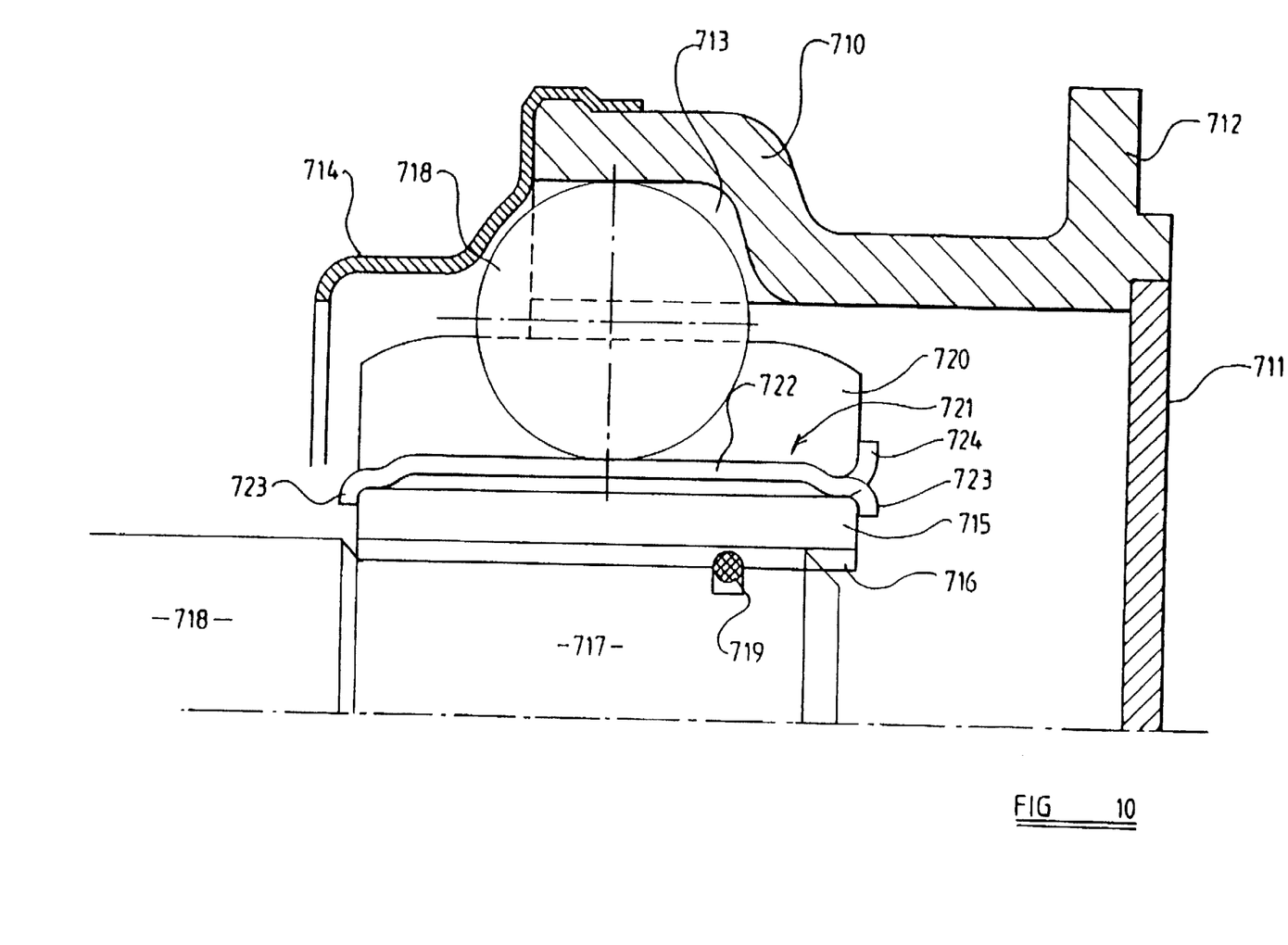
FIG. 10 is a longitudinal cross-section through part of yet a further embodiment of joint according to the invention.

Referring now to FIG. 10 of the drawings, this shows a joint which is not a constant velocity ratio universal joint but nevertheless utilises balls engaging grooves in inner and outer joint members for transmitting torque between the members. The joint is able to transmit torque at low angles of articulation between the joint members, and to accommodate relative axial movement between the joint members.

The joint of FIG. 10 comprises an outer joint member 710 closed at one end by a closure member 711 and provided with a drive flange 712. At the opposite end of the outer joint member there are provided circumferentially spaced internal ball-receiving grooves 713 which are engaged by respective balls 718 but the balls are able to move only a short distance axially within the grooves 713, being constrained by a closure member 714 of sheet metal secured to the outer joint member.

An inner joint member 715 is disposed partially within the outer joint member 710, the inner joint member being of annular configuration and having internal splines 716 by which it is torque transmittingly connected to a splined end portion 717 of a shaft 718 being retained thereon by a spring ring 719. The inner joint member 715 is provided with grooves 720 spaced circumferentially about its exterior and facing the grooves 713 in the outer joint member in opposed pairs, a respective ball 718 being disposed in each such facing pair. The arrangement is such that the inner joint member can articulate to a small extent relative to the outer joint member, and can move axially relative thereto by virtue of the length of the grooves 720. During such axial movement, the balls 718 slide along the grooves 720.

Grooves 720 have respective recesses in their bases, in each of which there is disposed a respective spring element 721. The configuration of each spring element 721 is analogous to that of the spring elements hereinbefore described: it comprises a central portion 722 which extends out of the recess at the groove base to contact the balls 718, end portions 723 which engage end surfaces of the inner joint member to retain the spring element relative to the inner joint member and a radially outwardly extending tag 724 at one end which is engageable with the respective balls 718 to prevent the inner joint member from being withdrawn totally from the outer joint member.

In this joint, as in the constant velocity ratio joint shown in FIGS. 8 and 9, the spring elements 721 have the effect of taking up any radial clearances which may exist between the balls and the grooves in the outer and inner joint members thereby to centre the inner joint member relative to the outer.

Figure 11:
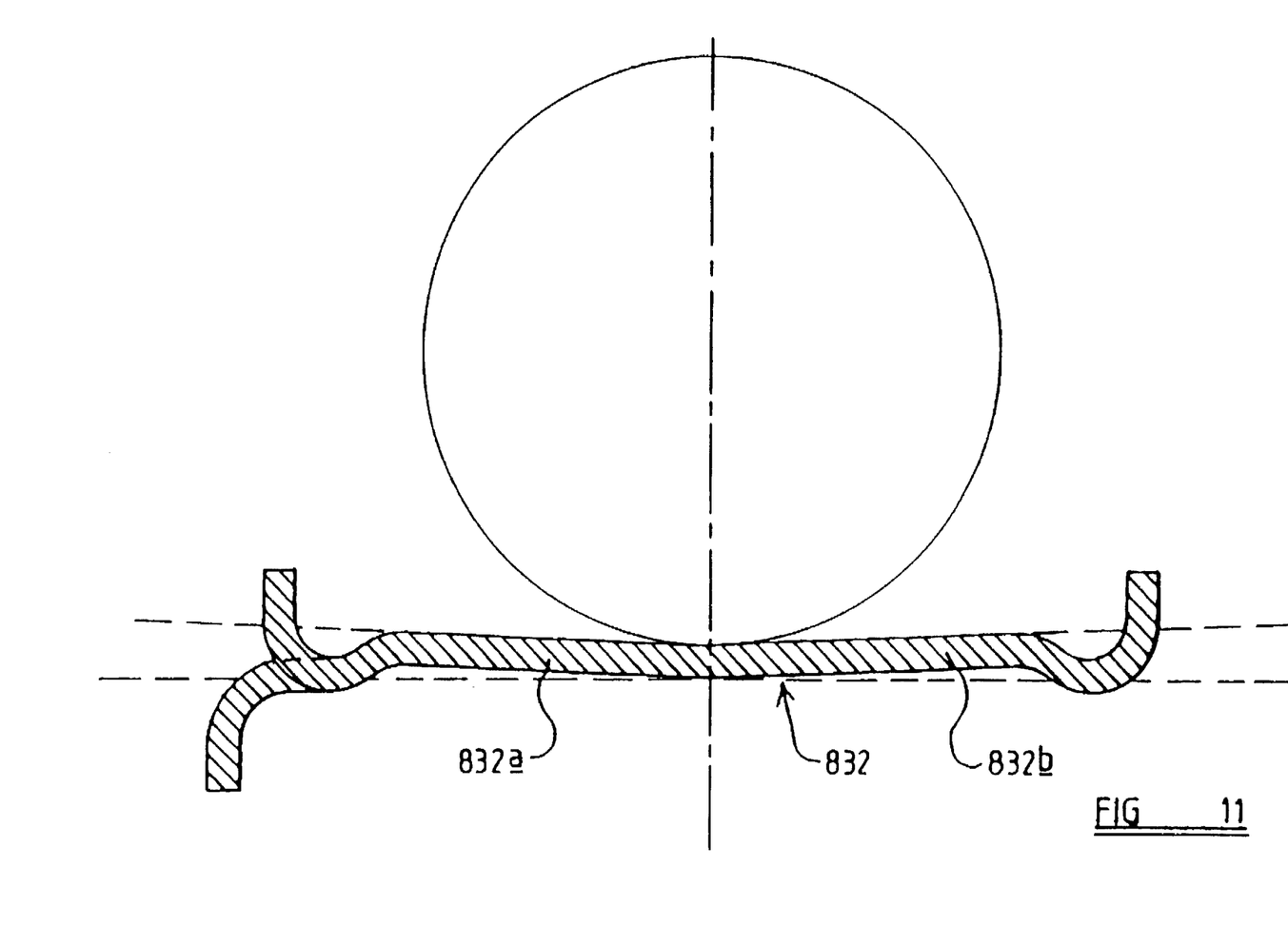
FIG. 11 is a view of a spring element for a joint according to the invention.

FIG. 11 shows in greater detail a possible configuration of a spring element such as is preferably employed in a rolling plunge constant velocity ratio universal joint such as shown in various embodiments in FIGS. 1 to 7 of the drawings. In its free state, the central portion shown as 832 of the spring element is not straight along its entire length but its two parts 832a, 832b are inclined to one another. Thus the effect of centering the ball axially relative to the spring element is increased. Alternatively the central portion of the spring element could be of bowed configuration to achieve the same effect.

In all the above described embodiments of joint, the recesses wherein the spring elements are disposed are generally of rectangular shape in transverse cross-section, to accommodate the leaf spring elements described. It is to be appreciated that recesses of other configuration could be provided and indeed the term "recess" used herein is intended to include any configuration of groove base portion which provides sufficient space to enable a spring element in accordance with the invention to be accommodated.

In all the above-described embodiments of joint, spring elements are provided for all the grooves of the inner or outer joint member. It will be appreciated that the advantages of the invention will be obtainable if spring elements are provided in some only of the grooves of the joint member for example in three grooves only of a joint member having six grooves, the spring elements being regularly circumferentially distributed about the joint member.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

It is claimed:

1. A universal joint comprising:

an outer joint member having a rotational axis and of hollow configuration, defining in the interior a number of straight grooves circumferentially spaced about said rotational axis and extending lengthwise of said axis;

an inner joint member disposed at least partially within the outer joint member and having a rotational axis and on the exterior of the inner joint member a number of straight grooves circumferentially spaced about said rotational axis of the inner joint member and facing the grooves of the outer joint member to form pairs of grooves;

a plurality of balls disposed one in each of said facing pairs of grooves, for torque transmission between the joint members;

each of at least some of the grooves in one of the joint members having a groove base portion defining a recess extending lengthwise of the groove;

a respective spring element disposed in each said recess for engaging the respective ball to bias the ball radially of the joint into engagement with the respective groove of the other of said joint members.

2. A joint according to claim 1 wherein each groove having said recess and spring element has a length which is engaged by the respective ball in use of the joint, and the spring element extends substantially the entire length of the groove.

3. A joint according to claim 2 wherein the spring element is a leaf spring element comprising a relatively long and narrow strip of resilient sheet material.

4. A joint according to claim 1, including a cage of annular configuration disposed between the two joint members and having windows which accommodate the balls and which maintain the balls with the centres in a single plane, there being provided means for causing the balls, when the joint is articulated, to be guided to assume positions such that the plane of the centres of the balls bisects the angle between the axes of rotation of the outer and inner joint members.

5. A joint according to claim 4, wherein the grooves in the outer and inner joint members extend parallel to the axes of rotation of the respective joint members and the outer joint member has portions of a cylindrical internal surface extending between the grooves of the outer joint member, the cage of the joint has an external part-spherical surface and an internal part-spherical surface which part-spherical surfaces have respective centres of curvature offset by substantially equal distances on opposite sides of the plane in which the centres of the balls lie; said external part-spherical surface of the cage engaging the internal cylindrical surface of the outer joint member; a guide member having an external part-spherical surface and the guide member movable axially relative to the inner joint member; said internal part-spherical surface of the cage engages the external part-spherical surface on the guide member; and wherein each said spring element is of a configuration to engage the respective ball and bias the ball axially to a position generally in the central region of the spring element.

6. A joint according to claim 5 wherein each spring element includes force means increasing such that the axially directed component of force applied to the ball increases as end portions of the spring element are approached by the ball.

7. A joint according to claim 6 wherein each spring element is provided at or adjacent the ball ends with stop formations engageable with the respective ball to limit movement of the ball along the grooves.

8. A joint according to claim 7 wherein said stop formations comprise tags integral with the spring element.

9. A joint according to claim 6 wherein each spring element comprises portions extending from the centre thereof to said end portions and inclined to one another.

10. A joint according to claim 1 wherein each of the respective spring elements is a separate component with respect to the other spring elements.

11. A joint according to claim 10 wherein said spring elements are pressing of sheet material.

12. A joint according to claim 1 wherein said spring elements are integral with and extend from an annular element.

13. A joint according to claim 12 wherein said annular element includes a surface for engagement by a spring ring.

14. A joint according to claim 12, wherein said spring elements are pressings of sheet material.

15. A joint according to claim 1 wherein said spring elements are provided in the grooves of the outer joint member.

16. A joint according to claim 1 wherein said spring elements are provided in the grooves of the inner joint member.

* * * * *

UNITED STATES PATENT AND TRADEMARK OFFICE
CERTIFICATE OF CORRECTION

PATENT NO. : 5,692,961
DATED : December 2, 1997
INVENTOR(S) : COLIN FRANCIS SAMUEL TURNER It is certified that error appears in the above-identified patent and that said Letters Patent is hereby corrected as shown below:

(Col. 1, line 20)    change "window" to --windows--.

(Col. 1, line 42)    change "devised however" to --devised, however,--.

(Col. 9, line 21)    change "in" to --In--.

(Col. 10, line 32)   change "includes force means increasing" to --includes force increasing means--.

Signed and Sealed this

Second Day of March, 1999

Attest:

Q. TODD DICKINSON

*Attesting Officer*    Acting Commissioner of Patents and Trademarks